United States Patent
Takahashi et al.

(10) Patent No.: US 8,887,159 B2
(45) Date of Patent: Nov. 11, 2014

(54) FLEXIBLE AND SCALABLE OPERATING SYSTEM ACHIEVING A FAST BOOT AND RELIABLE OPERATION

(75) Inventors: Hironori Takahashi, Redmond, WA (US); Motoki Hirano, Tokyo (JP); Peirong Liu, Newcastle, WA (US); Yoichi Sato, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 1640 days.

(21) Appl. No.: 12/243,843

(22) Filed: Oct. 1, 2008

(65) Prior Publication Data

US 2010/0083254 A1 Apr. 1, 2010

(51) Int. Cl.
*G06F 9/46* (2006.01)
*G06F 9/48* (2006.01)
*G06F 9/54* (2006.01)

(52) U.S. Cl.
CPC .............. *G06F 9/4843* (2013.01); *G06F 9/545* (2013.01)
USPC ...................................................... 718/100

(58) Field of Classification Search
None
See application file for complete search history.

(56) References Cited

U.S. PATENT DOCUMENTS

| | | | |
|---|---|---|---|
| 6,393,573 B1 | 5/2002 | Gillespie et al. | |
| 6,675,189 B2 | 1/2004 | Rehg et al. | |
| 6,957,314 B2 | 10/2005 | Beckert et al. | |
| 7,140,022 B2 | 11/2006 | Binns | |
| 2003/0188144 A1* | 10/2003 | Du et al. | 713/1 |
| 2003/0204549 A1* | 10/2003 | Eibach et al. | 709/102 |
| 2004/0123137 A1* | 6/2004 | Yodaiken | 713/200 |
| 2006/0142906 A1 | 6/2006 | Brozovich et al. | |
| 2006/0282654 A1 | 12/2006 | Veen et al. | |
| 2007/0169126 A1 | 7/2007 | Todoroki et al. | |
| 2011/0016300 A1* | 1/2011 | Lee | 713/2 |

OTHER PUBLICATIONS

Victor Yodaiken et al., "RTLinux/RTCore dual kernel real-time operating system", FSMLabs, White Paper, Mar. 2003.*
"Green Hills Software Introduces Next Generation In-Car Infotainment Reference Platform; Reliable, Scalable and Cost Effective Platform for Automotive OEMs", Date: Apr. 11, 2005, http://findarticles.com/p/articles/mi_m0EIN/is_2005_April_11/ai_n13594069.
"PCS-8220 Embedded Car PC Infotainment System", Date: Dec. 28, 2006, http://embedded-system.net/pcs-8220-embedded-car-pc-infotainment-system.html.
"Fast-Boot for Windows Automotive," Microsoft Corporation, http://msdn.microsoft.com/en-us/library/ms858380.aspx, Accessed Jun. 19, 2008.
"Integrity RTOS for In-Car Infotainment," Green Hills Software, Inc., http://www.ghs.com/products/infotainment_INTEGRITY.html, Accessed Jun. 19, 2008.
"Wind River Solutions for the Automotive Market," Wind River, http://www.windriver.com/solutions/automotive/, Accessed Jun. 19, 2008.

* cited by examiner

*Primary Examiner* — William B Partridge
(74) *Attorney, Agent, or Firm* — John Jardine; Micky Minhas

(57) ABSTRACT

Systems and methods are provided for a flexible and scalable operating system achieving a fast boot. A computing system is described that includes a reserved static object memory configured to store predefined static threads, and a secure kernel configured to be executed in a fast boot mode. The secure kernel further may be configured to chain the static threads to a secure kernel thread queue stored in a secure kernel work memory, and to create temporary threads in the secure kernel work memory during the fast boot mode. The computing system may include a main kernel configured to be initialized by creating dynamic threads in a main kernel work memory during the fast boot mode. The main kernel may be configured to chain the static threads to a main kernel thread queue, and to assume control of the static threads from the secure kernel.

20 Claims, 5 Drawing Sheets

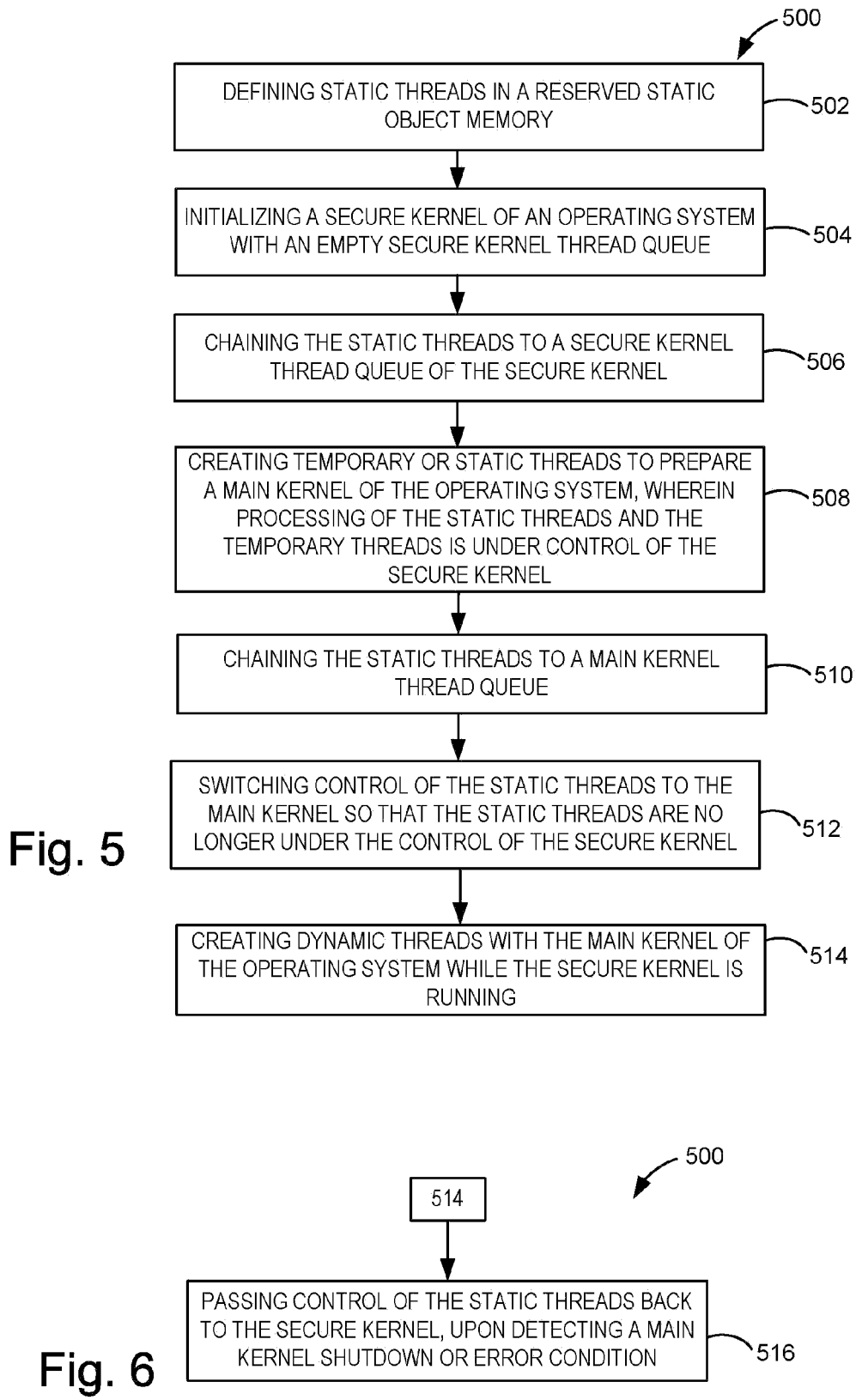

FLEXIBLE AND SCALABLE OPERATING SYSTEM ACHIEVING A FAST BOOT AND RELIABLE OPERATION

BACKGROUND

Some computing devices are configured to perform both relatively simple functions, and relatively complex functions. The operating systems for these computing devices tend to have long boot-up times to prepare for running the complex functions. This, of course, delays the start time for performing the relatively simple functions until the whole operating system is booted up.

Some car information systems are used to execute certain software in a short amount of time, for example within 50-100 msec after power-on. Such software may include in-vehicle network software, and other systems software for powering up the vehicle. Operating systems (OS) such as Windows® CE and Linux® have difficulty booting in this amount of time, because of the time taken up by dynamic creation of processes, threads, synchronization objects, work memories, etc. On the other hand, some real-time operating systems (RTOS) have fast boot up performance, because tasks, synchronization objects and work memories are statically created and initialization can be done very quickly. However, RTOS lack the flexibility and scalability to handle complex and high-performance features found in some car information systems.

One approach that has been proposed to gain the benefits of both a dynamic multithreaded OS and an RTOS is to use two control processing units (CPUs). One CPU may be configured to execute an RTOS, and the other may be configured to execute a generic OS, or an RTOS. However, using two CPUs may be cost prohibitive, and it may be difficult to coordinate tasks running on each CPU.

Another proposed approach is to use a hybrid OS. A hybrid OS may enable two different operating systems to run on a single CPU. An RTOS may be used for a fast boot, and a generic OS may be used for flexibility in a hybrid OS system.

However, there are several drawbacks with the hybrid OS approach. For example, the RTOS and the generic OS may have different synchronization mechanisms. This may be because the generic OS may have a richer synchronization mechanism than the RTOS. Therefore rich scheduling mechanisms, such as priority inheritance, cannot be utilized in synchronization between tasks in the different OSs. Other drawbacks may include additional task switch overhead to schedule for each OS, increased developer training costs, or development tools not working properly. For example breaking at a task in one OS may corrupt the debugger connection of the other OS.

SUMMARY

Systems and methods are provided for a flexible and scalable operating system achieving a fast boot. The system may be a computing system with a dual kernel operating system. The computing system may include a reserved static object memory configured to store predefined static threads. A secure kernel may be configured to be executed in a fast boot mode of a boot-up process of the computing system. The secure kernel further may be configured to chain the static threads to a secure kernel thread queue stored in a secure kernel work memory, and to create temporary threads in the secure kernel work memory during the fast boot mode. A main kernel may be configured to be initialized by creating dynamic threads in a main kernel work memory during the fast boot mode in which the secure kernel controls the static threads. The main kernel may be configured to chain the static threads to a main kernel thread queue in the main kernel work memory, and to assume control of the static threads from the secure kernel, thereby terminating the fast boot mode and commencing a main boot mode in which control of the static threads is passed to the main kernel from the secure kernel.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a flowchart illustrating one embodiment of a method for operating a computing device.

FIG. 6 is a flowchart illustrating a possible variation of the method of FIG. 5.

DETAILED DESCRIPTION

Figure 1:
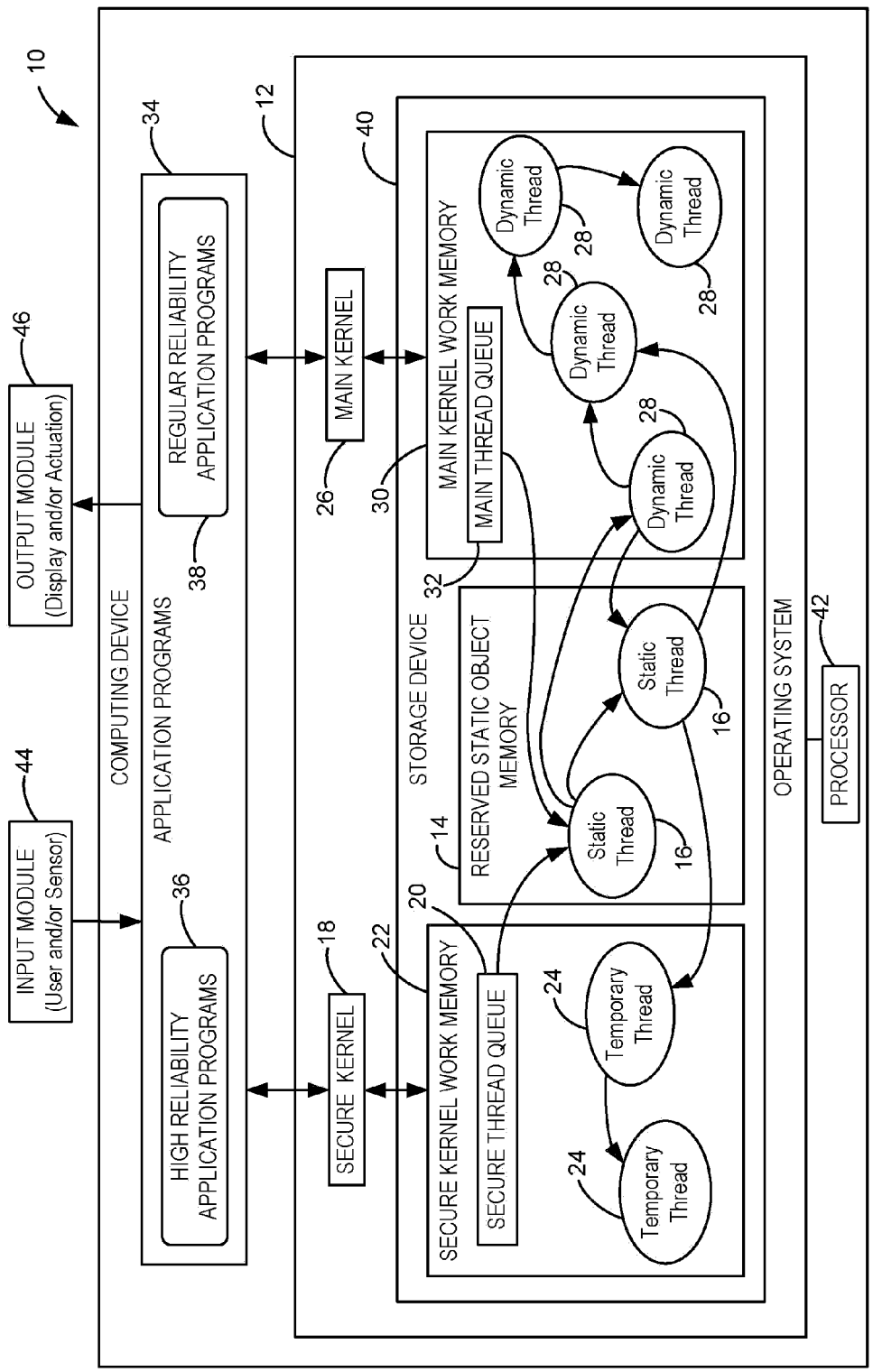
FIG. 1 is a schematic view illustrating an embodiment of a computing system for providing a flexible and scalable operating system achieving a fast boot.

FIG. 1 is a schematic view illustrating a computing system including a computing device 10 with a dual kernel operating system 12. The computing device 10 may include a reserved static object memory 14 configured to store predefined static objects, for example static threads 16. The static objects may also include processes, and synchronization objects. The synchronization objects may include semaphore, mutex, critical section, message queues, and the like. A secure kernel 18 may be configured to be executed in a fast boot mode of a boot-up process of the computing device 10. The secure kernel 18 may be further configured to chain the static threads 16 to a secure kernel thread queue 20 stored in a secure kernel work memory 22. The secure kernel 18 may be also be configured to create temporary threads 24 in the secure kernel work memory 22 during the fast boot mode.

A main kernel 26 may be configured to be initialized by creating dynamic threads 28 in a main kernel work memory 30 during the fast boot mode, in which the secure kernel 18 controls the static threads 16. The main kernel 26 may also be configured to chain the static threads 16 to a main kernel thread queue 32 in the main kernel work memory 30, and to assume control of the static threads 16 from the secure kernel 18, thereby terminating the fast boot mode and commencing a main boot mode in which control of the static threads 16 is passed to the main kernel 26 from the secure kernel 18. Static objects may also be passed back and forth between the secure kernel 18, and the main kernel 26.

The main kernel 26 may be further configured to pass control of the static threads 16 back to the secure kernel 18 upon detection of an error condition in the main kernel 26 or a request for shutdown of the main kernel 26. The dynamic threads created by the main kernel 26 may die upon control being passed to the secure kernel 18.

The computing device 10 may include a plurality of application programs 34 that may be configured to be executed on the computing device 10 by the secure kernel 18 and the main kernel 26. The application programs 34 may include high reliability application programs 36, and regular reliability application programs 38. The high reliability application programs 36 may be specified to continue operation even in the event of an error condition in the main kernel 26. The static threads 16 may be predefined for tasks to be performed by the high reliability application programs 36 but not for tasks to be performed by the regular reliability application programs 38, such that the high reliability application programs 36 may continue to be executed by the secure kernel 18 even in the event of an error condition in the main kernel 26.

The computing device 10 illustrated in FIG. 1 may include a computer readable storage device 40 storing executable instructions. When the executable instructions are executed by a processor 42, this may cause the processor 42 to define static threads 16 in a reserved static object memory 14, and initialize a secure kernel 18 of an operating system 12 with a secure kernel thread queue 20 that may be empty. The processor 42 may further be configured to chain the static threads 16 to the secure kernel thread queue 20 of the secure kernel 18, and create temporary threads 24 or static threads to prepare a main kernel 26 of the operating system 12. The processing of the static threads 16 and the temporary threads 24 may be under control of the secure kernel 18. The processor 42 may further be configured to chain the static threads 16 to a main kernel thread queue 32, switch control of the static threads 16 and the dynamic threads 28 to the main kernel 26 so that the static threads 16 are no longer under the control of the secure kernel 18, and create dynamic threads 28 with the main kernel 26 of the operating system 12.

The computing device 10 may be configured to keep at least some of the functionality of the computing device 10 running if a problem occurs. For example, in some embodiments the executable instructions may be further configured to cause the processor 42 to pass control of the static threads 16 back to the secure kernel 18, upon detecting a main kernel shutdown or error condition. This may enable to keep the static threads running while the main kernel 26 reboots.

The computing device 10 may be configured to receive various inputs from an input module 44. The inputs may include user inputs, or sensor inputs. The computing device 10 may also be configured to provide various outputs to an output module 46. The outputs may include for example, signals to cause a display to indicate one or more conditions, or one or more values. The outputs may also include one or more signals configured to cause an actuation of one or more actable devices coupled with the computing device 10.

Figure 2:
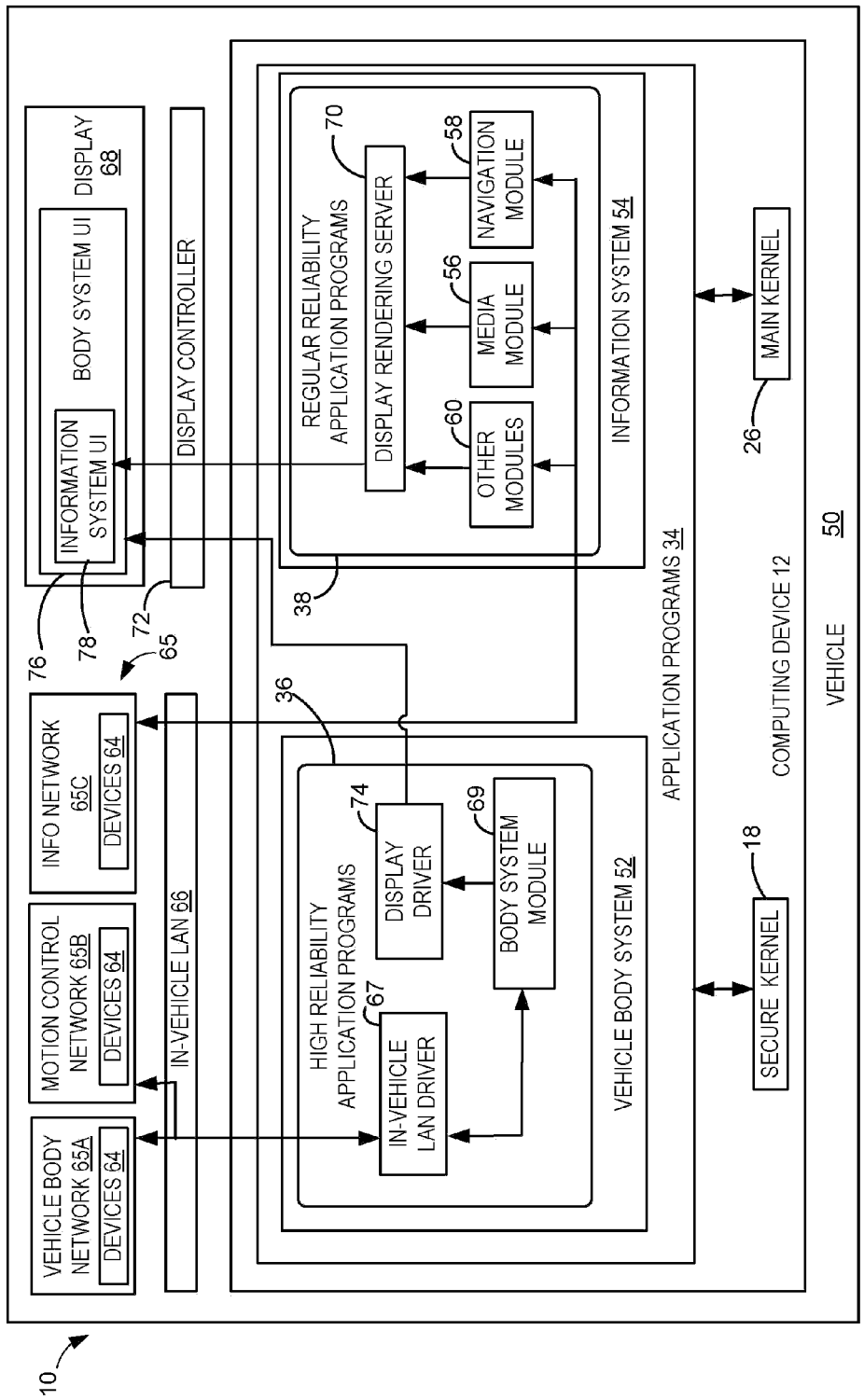
FIG. 2 is a schematic view illustrating the computing system of FIG. 1, shown in a vehicle operating environment.

FIG. 2 is a schematic view illustrating a variation of the computing device 10 illustrated in FIG. 1 wherein the computing device 10 may be resident on a vehicle 50. Each of the application programs 34 may be classified as being part of a vehicle body system 52 or an information system 54 of the vehicle 50. The high reliability application programs 36 may be part of the vehicle body system 52. Various embodiments may provide integration between the information system 54 and the vehicle body system 52 in that they may both be included in the same operating system 12.

The vehicle 50 may include various networks 65 of devices 64, such as sensors, cameras, media displays, etc. For example, a motion control network 65A, a vehicle body network 65B, and an information network 65C may be provided. Each of networks 65 includes various networked devices 64 within the vehicle that are controlled and/or monitored by corresponding software modules executed on computing device 10. Each of these software modules may have varying levels of specified reliability, depending on the desired performance of the corresponding network. Thus, regular reliability software modules may be included as part of the regular reliability application programs 38 while high reliability software modules may be included as part of the high reliability application programs 36.

The high reliability application programs 36 of the vehicle body system 52 may be configured to perform one or more vehicle control functions and/or vehicle monitoring functions using vehicle body network 65A and motion control network 65B, for example. The motion control network 65A may be utilized to implement functions such as control and/or monitoring and/or analysis of elements of the vehicle 50 including the engine, vehicle brakes (such as anti-lock brake systems), steering, and stability control. The vehicle body network 65B may be utilized to implement functions such as the display and control operating conditions of the vehicle 50 including the speed, fuel quantity, oil temperature, air conditioning status, seat position, rear view camera view, and the like. Communications between the computing device 10 and the motion control network 65B and the vehicle body network 65B travel through an in-vehicle local area network (LAN) 66, and an associated in-vehicle LAN driver 67. A body system module 69 may be operationally coupled with the in-vehicle LAN driver 67, and configured to process the information received from the devices 64 of the networks 65, and to generate a body system user interface 76 which is output for display on the display 68 associated with computing device 10, via display driver 74. The body system user interface 76 may include graphical representations of various operating conditions of the vehicle, based on information received from the devices 64 of the vehicle body network 65A and motion control network 65B.

The information system 54 may include one or more regular reliability application programs 38, including a media module 56 and/or a navigation module 58. Other modules 60 may also be included, for example, a telephone module, and/or traffic module, and/or a services module. The media module 56 may be configured to receive a media signal from a media device such as a digital video disk (DVD) player, MP3 player, and/or radio receiver, all of which are devices of information network 65C. The navigation module may be configured to interface with a global positioning satellite enabled navigation device, map libraries, and/or on-vehicle compass, all of which are devices of information network 65C. The output of the navigation module 58, media module 56 and other modules 60 may be sent to a display rendering server 70, for preparation to be displayed as an information system user interface 78.

Display 68 may be configured to communicate with both the information system 54 and the vehicle body system 52 via a display controller 72. As illustrated, the body system user interface on the display typically contains graphical output from high reliability application programs 36 of the vehicle body system 52, while the information system user interface 78 typically includes graphical output from the regular reliability application programs 38 of the information system 54. Thus, it will be appreciated that during the fast boot mode, the body system user interface is first displayed, and then during the main boot mode the information system user interface 78, with its more feature rich content, is displayed within, or proximate to, the body system user interface. If control passes back to the secure kernel due to an error condition, it will be appreciated that the information system user interface 78 may terminate or go blank, while the remainder of the body system user interface remains operational under the control of the secure kernel.

In other embodiments, the computing device 10 may be resident on a web-enabled mobile phone device, and the high reliability application programs 36 may be configured to enable a user to make telephone calls. In this example the regular reliability application programs 38 may be selected from the group consisting of a media player, web browser, or email client. It will further be appreciated that the dual kernel operating system described above may be implemented on suitable devices other than vehicle computing devices and web-enabled mobile phone devices, which have a set of high reliability application programs that are be booted up and available for use during a relatively short period of time, and other regular reliability application programs that are more feature rich, but are not booted up in such a short amount of time.

Figure 3A:
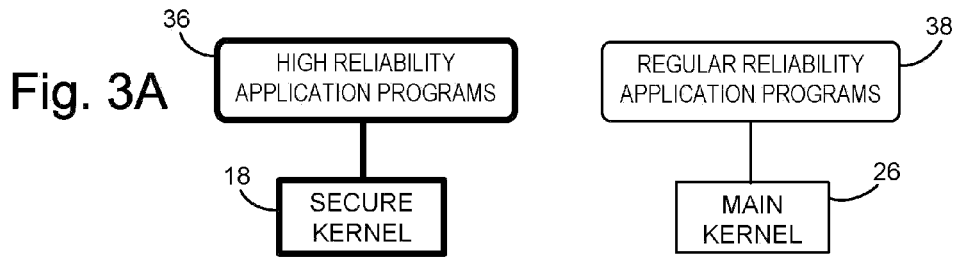
FIGS. 3A through 3D are schematic views illustrating an example sequence of operational control of various components of the system illustrated in FIGS. 1 and 2.
Figure 3B:
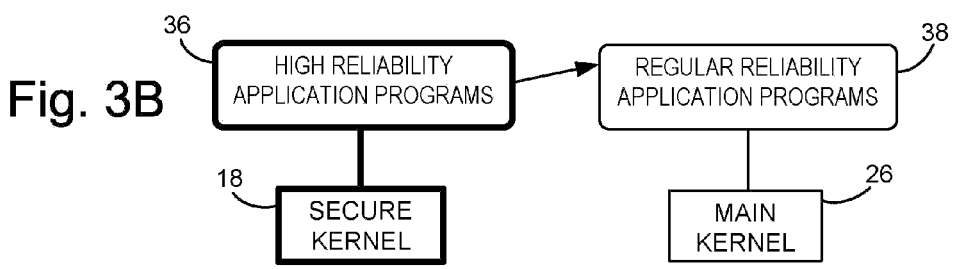
Figure 3C:
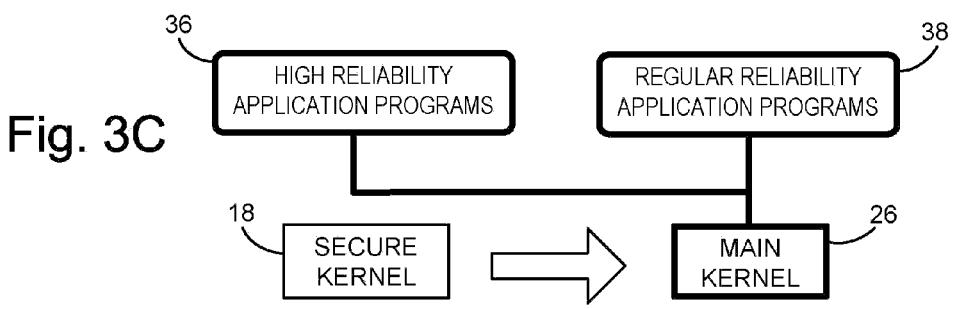
Figure 3D:
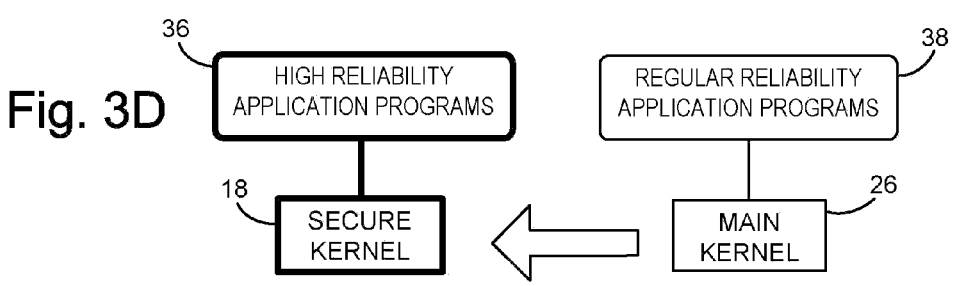

FIGS. 3A through 3D are schematic views illustrating an example sequence of operational control of various components of systems such as those illustrated in FIGS. 1 and 2. As illustrated in FIG. 3A, the computing device 10 may launch, for example, in-vehicle LAN threads or graphic control threads. These threads may be started quickly with the secure kernel 18. Then, as illustrated in FIG. 3B, the main kernel may be initialized, static threads may be handed over to the main kernel, and other threads may be created dynamically. Then, as illustrated in FIG. 3C, the main kernel may take over these threads. Then, as illustrated in FIG. 3D, if an error condition occurs in the main kernel 26 itself, and/or in the regular reliability application programs 38, control may pass back to the secure kernel 18, and the static threads 16 may keep running on the secure kernel 18 while the main kernel 26 reboots. Thus, the high reliability application programs 36 may not become nonoperational, even if main kernel 26 has trouble and reboots.

Figure 4:
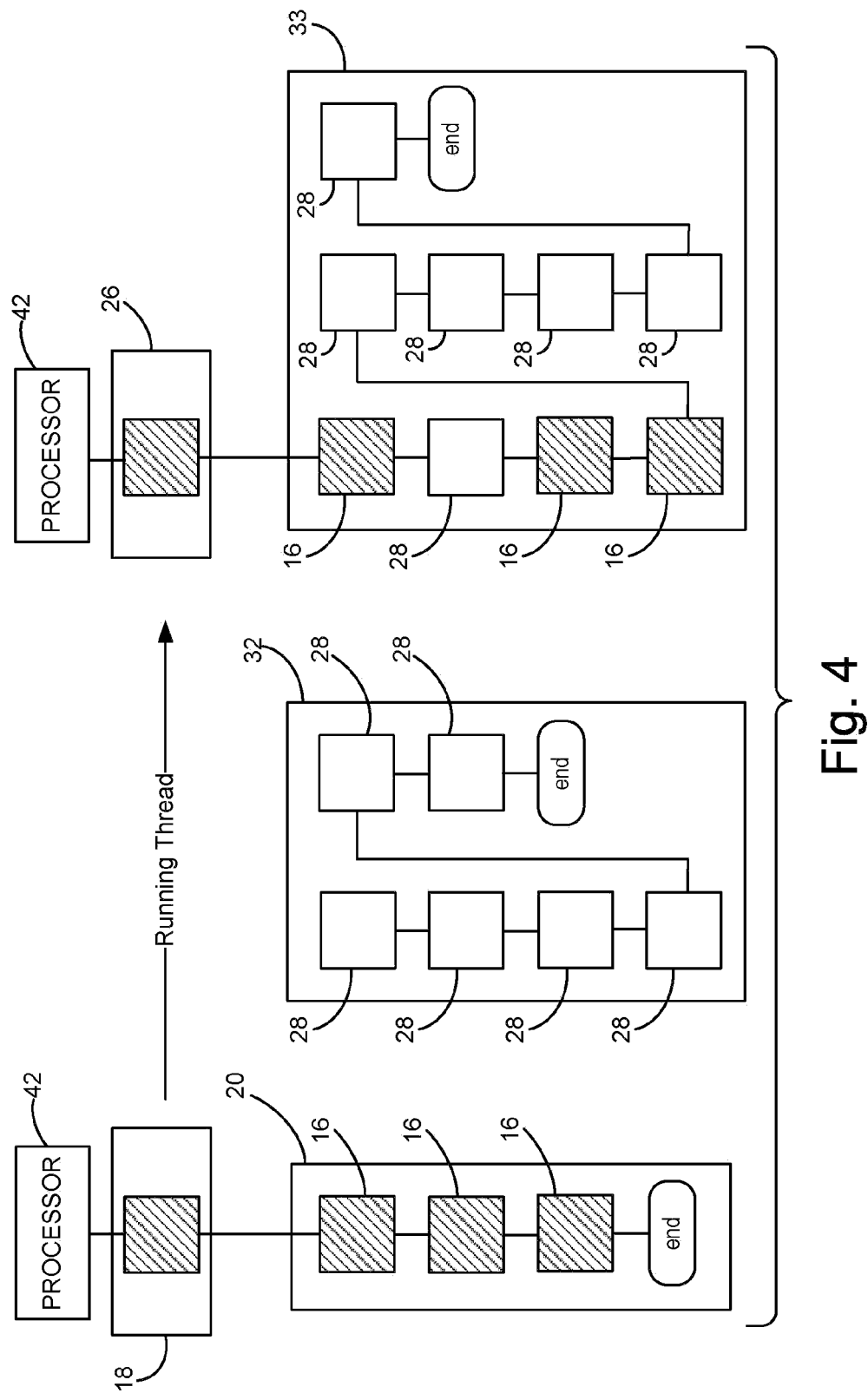
FIG. 4 is a schematic view illustrating an example thread management scenario that may be conducted by the system illustrated in FIGS. 1 and 2.

FIG. 4 is a schematic view illustrating an example thread management scenario that may be conducted by the system illustrated in FIGS. 1 and 2. During the initial boot-up of the secure kernel 18, static threads 16 may be chained with the secure kernel thread queue 20. During the initialization of the main kernel 26, dynamic threads 28 may be chained with the main kernel thread queue 32. Once control is with the main kernel 26, the static threads 16 and the dynamic threads 28 may be chained in the main kernel thread queue 32, illustrated here as runtime main kernel thread queue 33.

FIG. 5 is a flowchart illustrating an embodiment of a method 500 for operating a computing device. The method 500 may be implemented via the hardware and software components and systems described above, but alternatively may be implemented using other suitable hardware and software components. The method 500 may include, at 502, defining static threads in a reserved static object memory. At 504, the method may include initializing a secure kernel of an operating system with an empty secure kernel thread queue. At 506, the method may include chaining the static threads to a secure kernel thread queue of the secure kernel. At 508, the method may include creating temporary and/or static threads to prepare a main kernel of the operating system, wherein processing of the static threads and the temporary threads is under control of the secure kernel. At 510, the method may include chaining the static threads to a main kernel thread queue. At 512, the method may include switching control of the static threads to the main kernel so that the static threads are no longer under the control of the secure kernel. At 514, the method may include creating dynamic threads with the main kernel of the operating system.

FIG. 6 is a flow chart illustrating a variation of the method 500 illustrated in FIG. 5. The method 500 may include, at 516, passing control of the static threads back to the secure kernel, upon detecting a main kernel shutdown or error condition.

In various embodiments of the method the temporary threads and the dynamic threads may die when control is passed from the main kernel back to the secure kernel, and the static threads may be kept alive for further processing, as described above.

In various embodiments of the method the initializing, at 504, through the switching, at 514, steps may be performed during a boot-up process of the computing device. The defining at 502, may be performed during a programming and build phase of various embodiments. More particularly, the initializing through the chaining the static threads to a secure kernel thread queue may be performed during a fast boot mode of the boot-up process. Further, it will be appreciated that the initializing may be performed as part of a snapshot boot process.

Further, as described above, the computing device may be coupled to a vehicle body system and an information system of a vehicle. The secure kernel may be configured to process tasks of application programs of the vehicle body system during the fast boot mode, and the main kernel may be configured to process tasks of application programs of both the vehicle body system and the information system during the main boot mode. The information system may include a media module and/or a navigation module, or other information system modules, which may be classified as regular reliability application programs to be processed by the main kernel, as described above. The vehicle body system may further include a body system module configured to process information from devices on a vehicle body network and/or a motion control network of the vehicle. The body system module may be classified as a high reliability application program, and the processes of this high reliability application program may be processed by the secure kernel during the fast boot mode, as described above.

In various embodiments the fast boot mode of the boot-up of the operating system may begin at key-on, i.e., at a time when a driver initiates a vehicle start sequence with the key. The switching control of the static threads and the dynamic threads to the main kernel typically occurs after the main kernel is initialized and capable of controlling threads.

The systems and methods described above may be used in a variety of computing environments, including vehicular and web-enabled mobile phone environments, to enable tasks of high reliability application programs to be processed by a secure kernel that boots up quickly in a fast boot mode, and to enable tasks of more feature rich, complex application programs to be processed by a main kernel once it has booted up and control has been passed from the secure kernel to the main kernel. The system and methods also enable robust operation of the high reliability application programs during error conditions, when control may be passed from the main kernel back to the secure kernel, to thereby allow rebooting of the main kernel without termination of the high reliability application programs.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computing system with a dual kernel operating system, the computing system comprising:
    a reserved static object memory configured to store predefined static threads;
    a secure kernel configured to be executed in a fast boot mode of a boot-up process of the computing system and initialized with an empty secure kernel thread queue stored in a secure kernel work memory, the secure kernel further being configured to chain the static threads to the secure kernel thread queue stored in the secure kernel work memory, and to create temporary threads in the secure kernel work memory during the fast boot mode;
    a main kernel configured to be initialized by creating dynamic threads in a main kernel work memory during the fast boot mode in which the secure kernel controls the static threads, the main kernel being configured to chain the static threads to a main kernel thread queue in the main kernel work memory, and to assume control of the static threads from the secure kernel, thereby terminating the fast boot mode and commencing a main boot mode, the fast boot mode booting in a shorter amount of time than the main boot mode, in which control of the static threads is passed to the main kernel from the secure kernel.

2. The computing system of claim 1, wherein the main kernel is further configured to pass control of the static threads back to the secure kernel upon detection of an error condition in the main kernel or a request for shutdown of the main kernel.

3. The computing system of claim 2, wherein the dynamic threads created by the main kernel die upon control being passed to the secure kernel.

4. The computing system of claim 2, wherein a plurality of application programs are configured to be executed on the computing system by the secure kernel and the main kernel, and wherein the application programs include high reliability application programs that are specified to continue operation even in an event of an error condition in the main kernel and regular reliability application programs, and wherein the static threads are predefined for tasks to be performed by the high reliability application programs but not for the regular reliability application programs, such that the high reliability application programs can continue to be executed by the secure kernel even in the event of an error condition in the main kernel.

5. The computing system of claim 4, wherein the computing system is resident on a vehicle, and each of the application programs is classified as being part of a vehicle body system or an information system of the vehicle, and wherein the high reliability application programs are part of the vehicle body system.

6. The computing system of claim 5, wherein the information system includes application programs including a media module and/or a navigation module, telephone module, traffic module, and/or services module.

7. The computing system of claim 5, wherein the high reliability application programs of the vehicle body system are configured to perform one or more vehicle control functions and/or vehicle monitoring functions.

8. The computing system of claim 4, wherein the computing system is resident on a web-enabled mobile phone device, and wherein the high reliability application programs are configured to enable a user to make telephone calls, and the regular reliability application programs are selected from the group consisting of a media player, web browser, or email client.

9. A method for operating a computing device, comprising:
    defining static threads in a reserved static object memory;
    initializing a secure kernel of an operating system with an empty secure kernel thread queue;
    chaining the static threads to a secure kernel thread queue of the secure kernel;
    creating temporary threads or static threads to prepare a main kernel of the operating system, wherein processing of the static threads and the temporary threads is under control of the secure kernel;
    chaining the static threads to a main kernel thread queue;
    switching control of the static threads to the main kernel so that the static threads are no longer under the control of the secure kernel; and
    creating dynamic threads with the main kernel of the operating system.

10. The method of claim 9, further comprising passing control of the static threads back to the secure kernel, upon detecting a main kernel shutdown or error condition.

11. The method of claim 10, wherein the temporary threads and the dynamic threads die when control is passed from the main kernel back to the secure kernel, and the static threads are kept alive for further processing.

12. The method of claim 9, wherein the initializing through the switching are performed during a boot-up process of the computing device.

13. The method of claim 11, wherein the initializing through the chaining the static threads to a secure kernel thread queue are performed during a fast boot mode of the boot-up process.

14. The method of claim 9, wherein the initializing is part of a snapshot boot.

15. The method of claim 13, wherein the computing device is coupled to a vehicle body system and an information system of a vehicle, and wherein the secure kernel is configured to process tasks of application programs of the vehicle body system during the fast boot mode, and wherein the main kernel is configured to process tasks of application programs of both the vehicle body system and the information system during the main boot mode.

16. The method of claim 15, wherein the information system includes a media module and/or a navigation module.

17. The method of claim 15, wherein the vehicle body system includes a body system module configured to process information from devices on a vehicle body network and/or a motion control network of the vehicle.

18. The method of claim 15, wherein the fast boot mode of the boot-up process of the operating system begins at key-on of the vehicle, the switching control of the static threads to the main kernel occurs after the main kernel is initialized and capable of controlling threads.

19. A computing device, comprising non-volatile memory storing executable instructions that, when executed by a processor, cause the processor to:
- define static threads in a reserved static object memory;
- initialize a secure kernel of an operating system with an empty secure kernel thread queue;
- chain the static threads to a secure kernel thread queue of the secure kernel;
- create temporary threads or static threads to prepare a main kernel of the operating system, wherein processing of the static threads and the temporary threads is under control of the secure kernel;
- chain the static threads to a main kernel thread queue;
- switch control of the static threads to the main kernel so that the static threads are no longer under the control of the secure kernel; and
- create dynamic threads with the main kernel of the operating system.

20. The computing device of claim 19, wherein the executable instructions are further configured to cause the processor to pass control of the static threads back to the secure kernel, upon detecting a main kernel shutdown or error condition.

\* \* \* \* \*